United States Patent [19]
Weare et al.

[11] Patent Number: 5,909,483
[45] Date of Patent: *Jun. 1, 1999

[54] REMOTE SUBSCRIBER MIGRATION

[75] Inventors: Gerald W. Weare, Sherborn; Evelyn J. Tate, Sudbury, both of Mass.

[73] Assignee: Comverse Network Systems, Inc., Wakefield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/709,672

[22] Filed: Sep. 9, 1996

Related U.S. Application Data

[63] Continuation of application No. 08/279,208, Jul. 22, 1994, abandoned.

[51] Int. Cl.⁶ .................................................. H04M 1/64
[52] U.S. Cl. .................................. 379/88.18; 379/88.23; 379/220
[58] Field of Search ................................. 379/67, 88, 89, 379/219, 220, 221, 156, 158, 67.1, 88.18, 88.22, 88.23, 88.24, 88.25; 395/200

[56] References Cited

U.S. PATENT DOCUMENTS

| | | | |
|---|---|---|---|
| 4,790,003 | 12/1988 | Kepley et al. | 379/88 |
| 4,933,967 | 6/1990 | Lo et al. | 379/89 |
| 5,113,430 | 5/1992 | Richardson, Jr. et al. | 379/88 |
| 5,333,266 | 7/1994 | Boaz et al. | 379/89 |
| 5,381,466 | 1/1995 | Shibayama et al. | 379/88 |
| 5,454,030 | 9/1995 | de Oliveira et al. | 379/88 |

FOREIGN PATENT DOCUMENTS

| | | |
|---|---|---|
| 0 412 799 | 2/1991 | European Pat. Off. . |
| 0 560 111 | 9/1993 | European Pat. Off. . |
| 0 564 669 | 10/1993 | European Pat. Off. . |
| 88 08654 | 11/1988 | WIPO . |

OTHER PUBLICATIONS

European Search Report, The Hague, Dec. 18, 1996.

*Primary Examiner*—Fan S. Tsang

[57] ABSTRACT

In a processing system distributed over a large geographic area, data are transferred from one system to another by a combination of as needed basis and a continually executing background utility. To transfer voice mailboxes and voice-mail processing to a newly installed or under-utilized system, a communication network is established between at least one source system and a destination system. The migration function is activated on the destination system by specifying one or more migration ranges of mailboxes. When a call is received for one of the mailboxes in the migration range(s), if the destination system does not have the mailbox information in its database, a query is sent to the source system to retrieve the mailbox information which is stored at the destination system. Messages are retrieved from the source system by the destination system using remote play capabilities. The background migration utility sequences through mailboxes in the specified migration range(s) and transfers all mailbox information which has not yet been transferred by queries. When the background utility is finished, the migration function can be deactivated and the mailboxes on the source system can be deleted when all of the voice messages of the migrated mailboxes have expired.

18 Claims, 8 Drawing Sheets

REMOTE SUBSCRIBER MIGRATION

This application is a continuation of application Ser. No. 08/279,308, filed Jul. 22, 1994, now abandoned.

CROSS-REFERENCE TO RELATED APPLICATIONS

This application is related to pending U.S. patent application Ser. No. 07/871,417 (now U.S. Pat. No. 5,260,990) and Ser. No. 07/871,770 (now U.S. Pat. No. 5,493,607), both filed Apr. 21, 1992. Both are assigned to the assignee of this application and both are incorporated herein by reference.

BACKGROUND OF THE INVENTION

1. Field of the Invention

The present invention is directed to transferring subscriber records and, as needed, messages for subscribers from one information services system to another and, more particularly, to performing such a transfer when each information services system operates on a local area network servicing tens of thousands or hundreds of thousands of subscribers.

2. Description of the Related Art

It has been become increasingly common, particularly in North America, for telephone companies to provide information services, such as voicemail, to subscribers. Examples of systems which enable public telephone companies to provide such services are described in U.S. Pat. Nos. 5,029,199; 5,193,110; and 5,260,990, all of which are assigned to the assignee of this application and are incorporated herein by reference. The systems are connected to a central office of a local telephone company or to a private branch exchange or other system handling calls for a large number of telephones When one of the telephones serviced by the central office or other system is not answered, the calling party is given an opportunity to leave a telephone message which is stored for later reproduction by the user of the called telephone. The mailbox owner is given the ability to reproduce, store or dispose of the messages in his or her voice mailbox.

Several of these information services systems may be connected at various nodes in a telephone network. The nodes may be all within a single local telephone company, or in several different local telephone companies, such as those within one or more of the regional Bell companies. Although these systems are designed to be easily expandable, the great popularity of the services provided, particularly voicemail, has required the installation of additional information services systems to service areas previously serviced by a single system. When the new system is installed, it is desirable to distribute the work done by old and new systems until they carry about the same load. Conventionally, a bulk transfer is used with removable media, such as magnetic tape, or via a direct connection between the two information services systems.

There are several drawbacks to using a bulk transfer to redistribute the subscriber data from one information services system to another. Scheduling a bulk transfer can be difficult, since a bulk transfer may cause a large load on system resources and at least the old system should be able to be used by subscribers during the transfer. Existing systems have such a large number of subscribers that it is very difficult, if not impossible, to prevent bulk transfers from impacting on the ability of the old information services system's ability to perform normal functions. It may even be necessary for the new and old information services systems to be out of service for a significant period of time during the transfer of data; although if magnetic media, such as tape, is used, the systems may be out of service at different periods of time.

Another problem with bulk transfers is the potential for loss of data or disruption of service for subscribers. For example, assume subscriber data on the old system are copied to a tape which is physically transported to the new system. Any messages left for the subscribers whose data are stored on the tape between the time that the data are copied and the new system begins taking messages for the subscribers, will be lost. Even if a bulk transfer is performed directly, e.g., via a wide area network (WAN), messages can be lost due to the lag between transfer of data and switching of service for a subscriber from the old system to the new system The only way to prevent lost messages in a bulk transfer method is to suspend service for the subscribers who have data being transferred This is an undesirable solution, since it may take many hours to create a tape, physically transport the tape to the new system, load the new system with data and switchover responsibility for handling the subscribers.

SUMMARY OF THE INVENTION

An object of the present invention is to provide for expansion of information services in a large geographic area by distributing information services systems throughout the area many miles apart Another object of the present invention is to provide for transfer of data from a first information services system to a second information services system without significantly impacting on the ability of either information services system to support normal operations.

A further object of the present invention is to provide a method for seamlessly expanding capacity of information services in a large geographic area with minimal changes to the hardware and software of the information services systems.

Yet another object of the present invention is to permit messages to be deposited at any time during expansion of information services capacity without losing any messages during the expansion.

A yet further object of the present invention is to permit ordinary operation personnel to control the process of redistributing the load when a new information services system is added in a geographical area.

Yet another object of the present invention is to redistribute the load between information services systems after a new information services system has been installed in its permanent location which may be many miles away from existing information services system(s).

A still further object of the present invention is to prevent loss or corruption of subscriber data and messages for subscribers without interruption of service when transferring service of subscribers from one information services system to another.

The above objects are attained by providing a method of redistributing use of system resources from a first information services system to a second information services system, comprising the steps of establishing a wide area network connection between the first and second information services systems; specifying at least one migration range identifying migrating resources to be migrated to the second information services system; moving existing data associated with the migrating resources to the second information services system as the existing data need to be accessed, using the wide area network connection; and storing newly created and modified data associated with the migrating resources on the second information services system.

Preferably, in addition to the existing data, such as subscriber information for any voice mailbox accessed by a subscriber or any other caller and voicemail messages that are accessed by subscribers, which are automatically moved from the first information services system to the second information services system according to the invention, the remaining data are moved by a background operation. At the time that the data begin to be transferred as described in the preceding paragraph, a background process is initiated on each of the first and second information services systems to transfer data within the at least one migration range from the first information services system to the second information services system. Preferably, this background process is given low priority, so that the call handling capacity of the systems is not impacted by execution of the background process.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
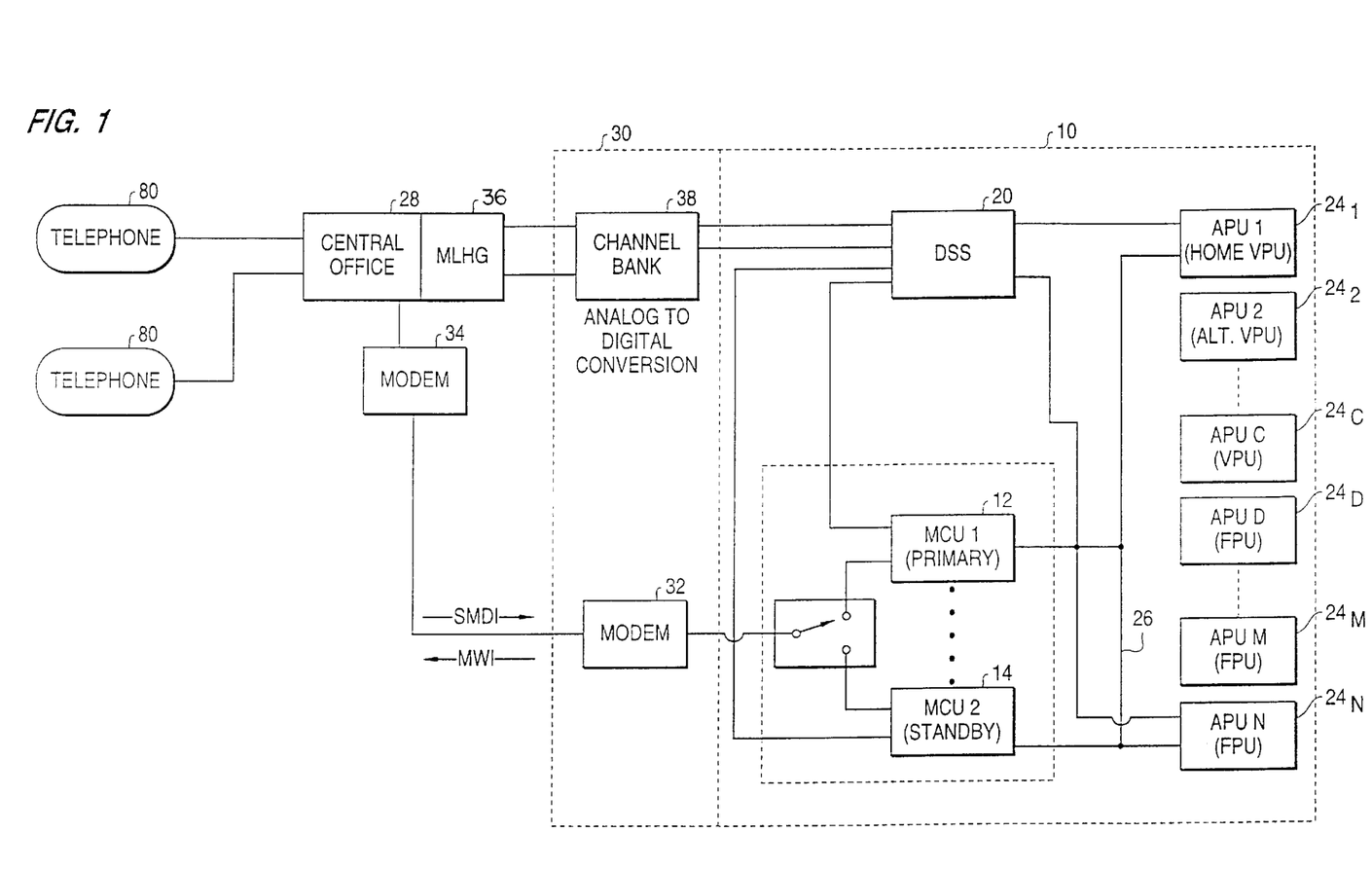
FIG. 1 is a block diagram of a data processing system for providing information services.

An information services system to which the present invention is applied is constructed as disclosed in the U.S. patents assigned to Boston Technology, Inc. which have been incorporated herein by reference As illustrated in FIG. 1, the information services system 10 is controlled by a master control unit (MCU) which preferably is provided in tandem as a primary MCU1 12 and a standby MCU2 14. The MCU includes storage for a database containing system configuration data and subscriber information including a mailbox with addresses of the messages stored for each subscriber. The MCU controls operation of a digital switching system (DSS) 20 and a plurality of application processing units (APUs) 24 which may include voice processing units (VPUs) $24_1$-$24_c$ and other APUs such as facsimile processing units (FPUs) $24_D$-$24_N$. The MCUs 12, 14 and APUs 24 are connected via a network connection 26 to form a local area network, preferably using an ETHERNET.

The information services system 10 is connected to a central office 28 via one or more Ti lines if the central office 28 is a digital switch and via analog/digital conversion unit 30 if the central office 28 is an analog switch. Modems 32, 34 are used to provide information regarding telephone callers to the information services system using the system message desk interface (SMDI) and to provide a message waiting indication (MWI) from the information services system 10 to the central office 28. The digital switching system 20 in the information services system 10 is connected to the central office via a multiline hunt group (MLHG) 36 and a channel bank 38 (if the central office 28 is an analog switch). In alternative embodiments of the information services system 10, other interfaces, such as common channel signalling system number 7 (SS7) and integrated services digital network (ISDN) may be used to transmit the information provided by SMDI and MWI in the illustrated embodiment.

Figure 2:
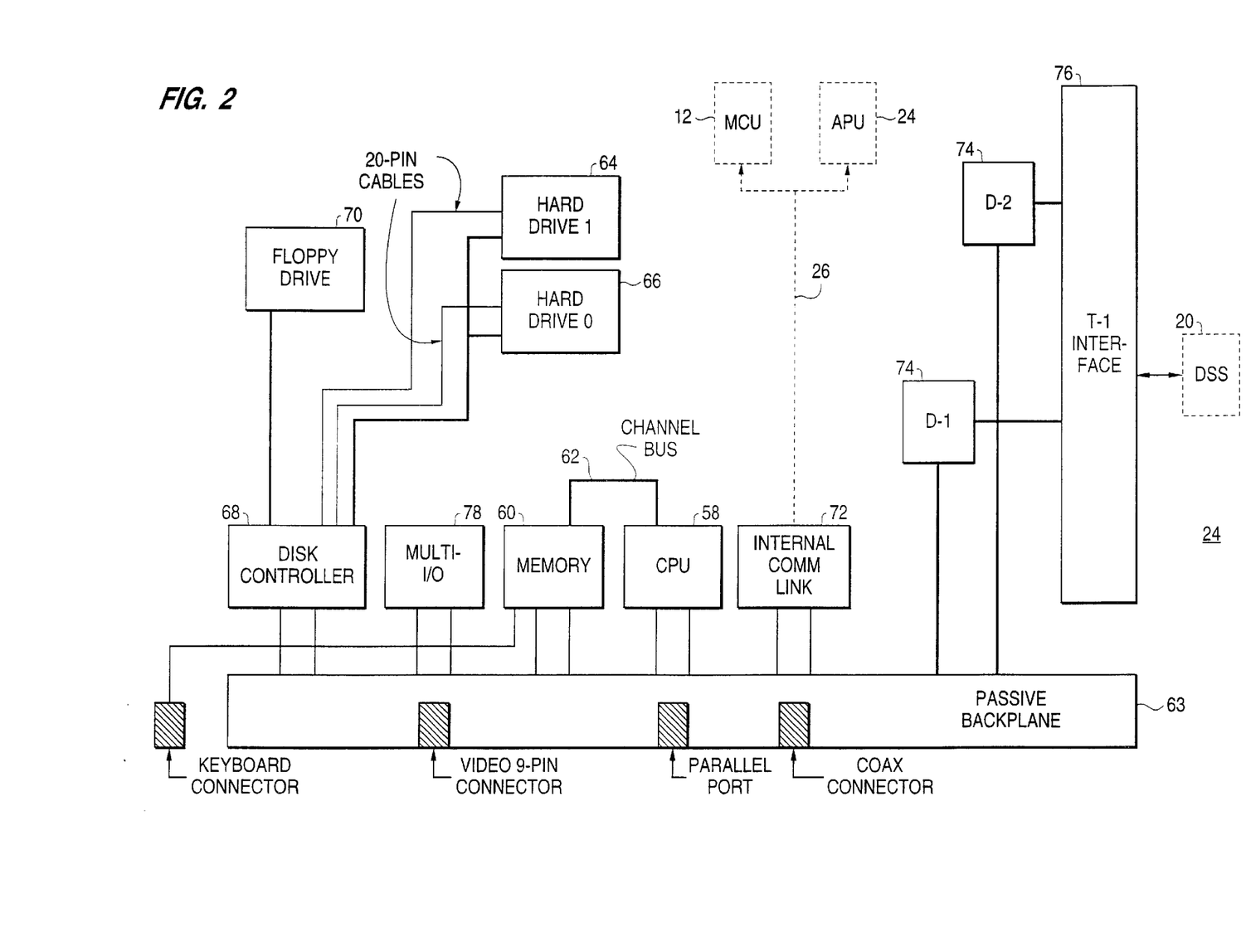
FIG. 2 is a block diagram of a voice processing unit in the information services system illustrated in FIG. 1.

The components of an APU 24 are illustrated in FIG. 2. Control of the APU 24 is provided by a processor (CPU) 58 which is connected via a passive backplane 63 to hard drives 64, 66 via a disk controller 68. The APU 24 is connected via digital switches 74 and a T1 interface 76 to the DSS 20. When the APU 24 provides voicemail services, the voice messages are stored on the hard drives 64, 66. The CPU 58 is programmed to provide services to subscribers as disclosed in the patents assigned to Boston Technology, Inc. which have been incorporated herein by reference.

Under conventional operation, callers using one of the telephones 80 (FIG. 1) can leave messages for subscribers and subscribers can retrieve their messages on the information services system 10. Each subscriber is assigned a home APU 24 where messages are stored provided a port is available when a caller wants to leave a message for that subscriber. If no ports are available, the message is routed by the DSS 20 to another APU. In either case, the location of the message is stored in the database for the subscriber in the MCU. The basic functions provided to subscribers are listen to, save, forward and delete messages. In addition, a system administrator is given the ability to create and delete mailboxes for subscribers and move the contents of one mailbox to another mailbox. The system administrator also can modify mailbox parameters, such as length of time that messages are retained, maximum number of messages, etc. on individual mailboxes, ranges of mailboxes, or all mailboxes on the information services system 10. Similar capabilities are provided for other information services, such as those provided by facsimile processing units $24_D$-$24_N$.

Figure 3:
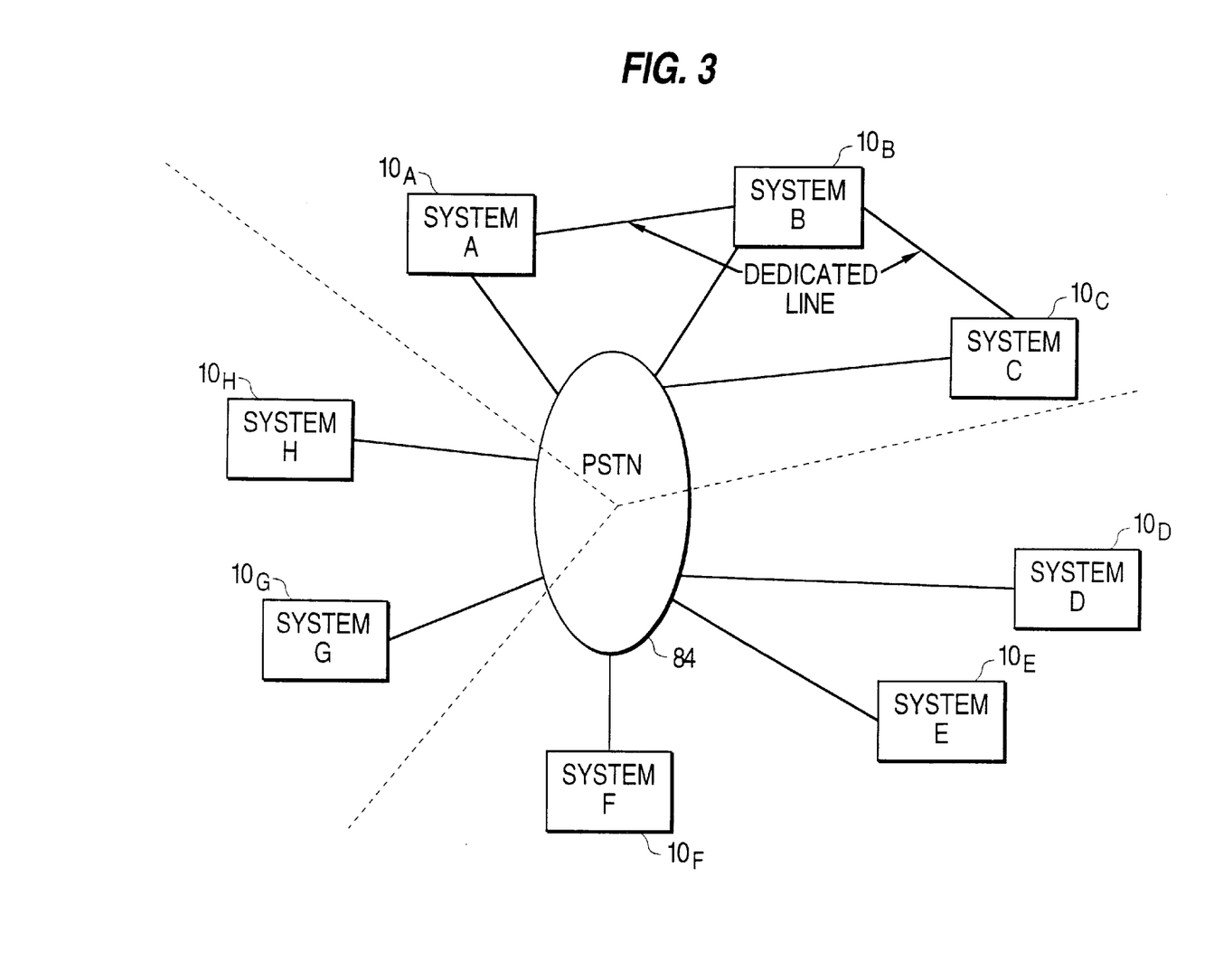
FIG. 3 is a block diagram of a plurality of information services systems distributed in a large geographic area.

FIG. 3 is a block diagram of eight information services systems 10 in a large geographic area. In the example illustrated in FIG. 3, the area includes three different area code service areas 82, but the present invention is not limited by geographical areas. The central office 28 illustrated in FIG. 1 is not illustrated in FIG. 3, but is part of the public switched telephone network (PSTN) 84. According to the present invention when a new information services system, such as information services system $10_B$ is added in a geographical area, a connection is made to at least one other existing information services system 10 with sufficient bandwidth to move data on an as needed basis without significantly affecting response time, e.g., increasing the typical delay in retrieving a message by no more than one or two seconds. Examples of how the connection could be provided include one or more dedicated T1 lines, ISDN PRI connections, asynchronous transfer mode (ATM) connections and X.25 public links. In the example illustrated in FIG. 3, information services system $10_B$ has been connected via a T1 line 86 to information services system $10_A$ and via a T1 line 88 to another information services system $10_C$.

In the following discussion, information services systems $10_A$, $10_B$ and $10_C$ will simply be referred to as system A, system B and system C. In addition, emphasis will be placed on the transfer of voice mailboxes from system A to system B as an example of control data, although the same operations could be performed for the expansion of other system resources in the large geographical area, including the transfer of other types of control data and can be performed simultaneously from multiple systems, such as systems A and C, using the same method.

After system B has been installed, system B is connected to system A and any other systems, such as system C, which contain data that are desired to be transferred to system B. Preferably, this connection is made by a dedicated line, such as one or more T1 lines to establish a wide area network (WAN) between the source system, ie, system A, and the destination system, i.e., system B.

Figure 4:
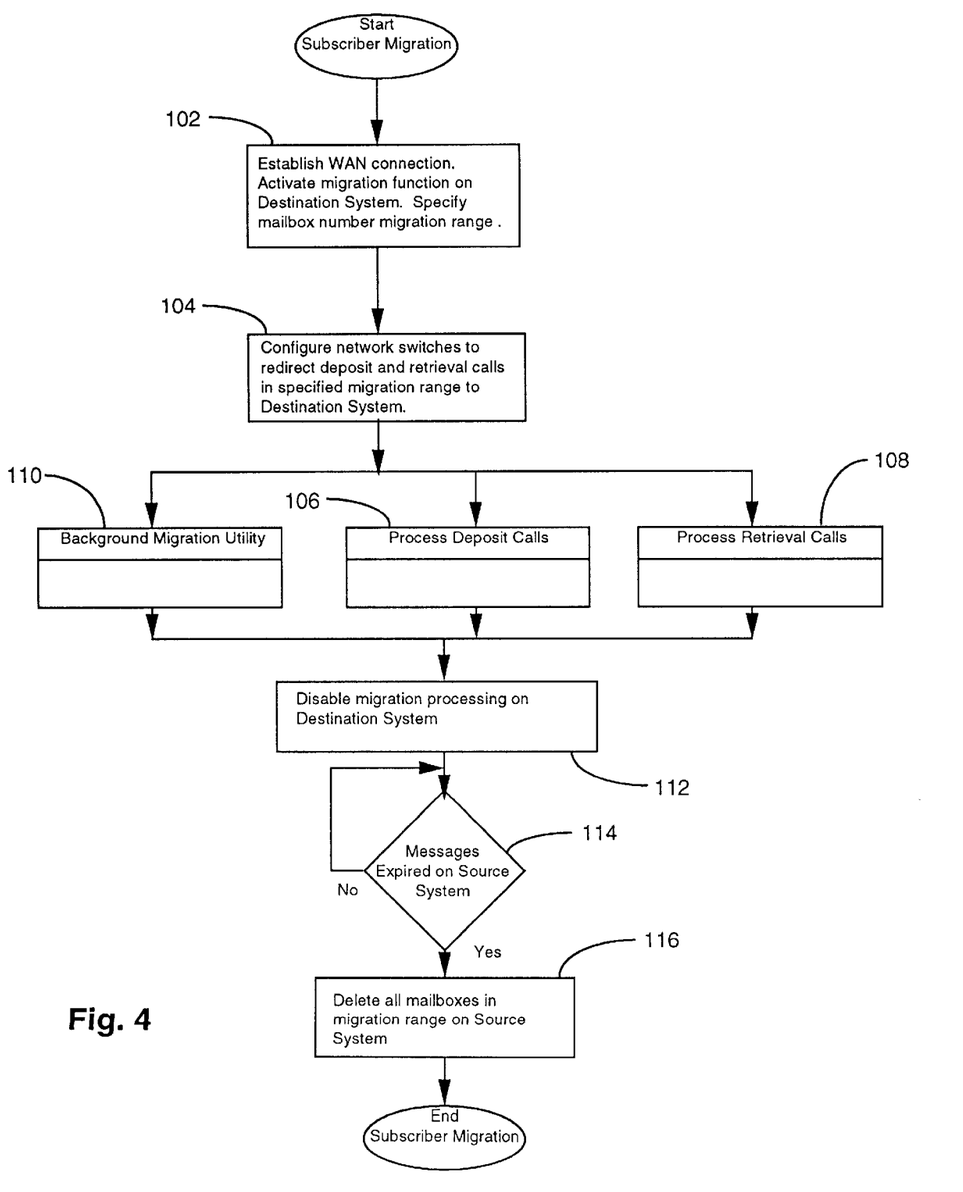
FIG. 4 is a flowchart of a method according to the present invention.

In the case of voice mailboxes, the transfer of data may be referred to as subscriber migration. The process of migrating resources, such as voice mailboxes, used by subscribers from system A to system B is illustrated as a flowchart in FIG. 4. As discussed above, the WAN connection is established, and then a migration function is activated on the destination system (system B) by specifying one or more migration ranges of mailbox numbers. The specified migration range(s) are used to determine where new data are processed and if necessary, stored. In the case of voicemail, network switches are configured 104 to redirect deposit and retrieval of calls in the specified migration range(s) to the destination system (system B).

For example, when a caller on one of the telephones 80 (FIG. 1) receives a busy signal for a telephone number of a subscriber having a voice mailbox in the migration range(s) specified for system B, the call is routed to system B and processed 106 using one of the APUs 24 in system B. Similarly, when a subscriber calls to retrieve his or her message data, i.e., voicemail messages, the retrieval call is processed 108 by system B. As described in more detail below, the process of retrieving calls includes the transfer of the existing data associated with the migrating resources of the subscribers on the MCU of a first system, e.g., system A, to a second system, e.g., system B. In addition, each message on the first or source system which the subscriber requests to be replayed is obtained from the source system and played back to the subscriber by the APU 24 in the second or destination system to which the subscriber is connected.

By transferring existing data from the source system to the destination system only when a deposit or retrieval call is received, the load on the source system will not be significantly greater than ordinary operations. However, it is likely that some mailboxes within the migration range(s) specified for the destination system will not be accessed in this manner for a long period of time. Therefore, to ensure that all mailboxes are migrated from the source system to the destination system in a predetermined period of time, such as 24 hours, a background migration utility is executed 110. As system and WAN resources permit, all of the data for subscribers which have not migrated by deposit and retrieval calls are transferred from the source system to the destination system by the background migration utility which is described in more detail below. It is possible to use either deposit and retrieval calls alone or the background migration utility alone, but in the preferred embodiment both are used to transfer data. By using all three processes 106, 108 and 110, all users of mailboxes in the migration range(s) are supported by the destination system as soon as migration begins, while all mailboxes are assured of being migrated in a predetermined period of time.

After the predetermined period of time has elapsed or when the background migration utility has completed moving all of the data prior to the end of the predetermined period of time, migration processing is disabled 112 on the destination system. From then on, the destination system operates in a conventional manner with messages remaining on the source system reproduced by the destination system using remote play capabilities that are described below.

In the preferred embodiment, messages are not deleted on the source system, but remain until the messages expire in a conventional manner after a predetermined period of time, such as 1 week. When it is determined 114 that all of the messages on the source system have expired, the mailboxes in the migration range(s) may be deleted 116 on the source system to make the memory resources they use available. As noted above, deletion of mailboxes, like creation of mailboxes is an ordinary capability of voice mail systems typically performed by system administrators. At this time the dedicated lines 86, 88 may be disconnected.

Figure 5:
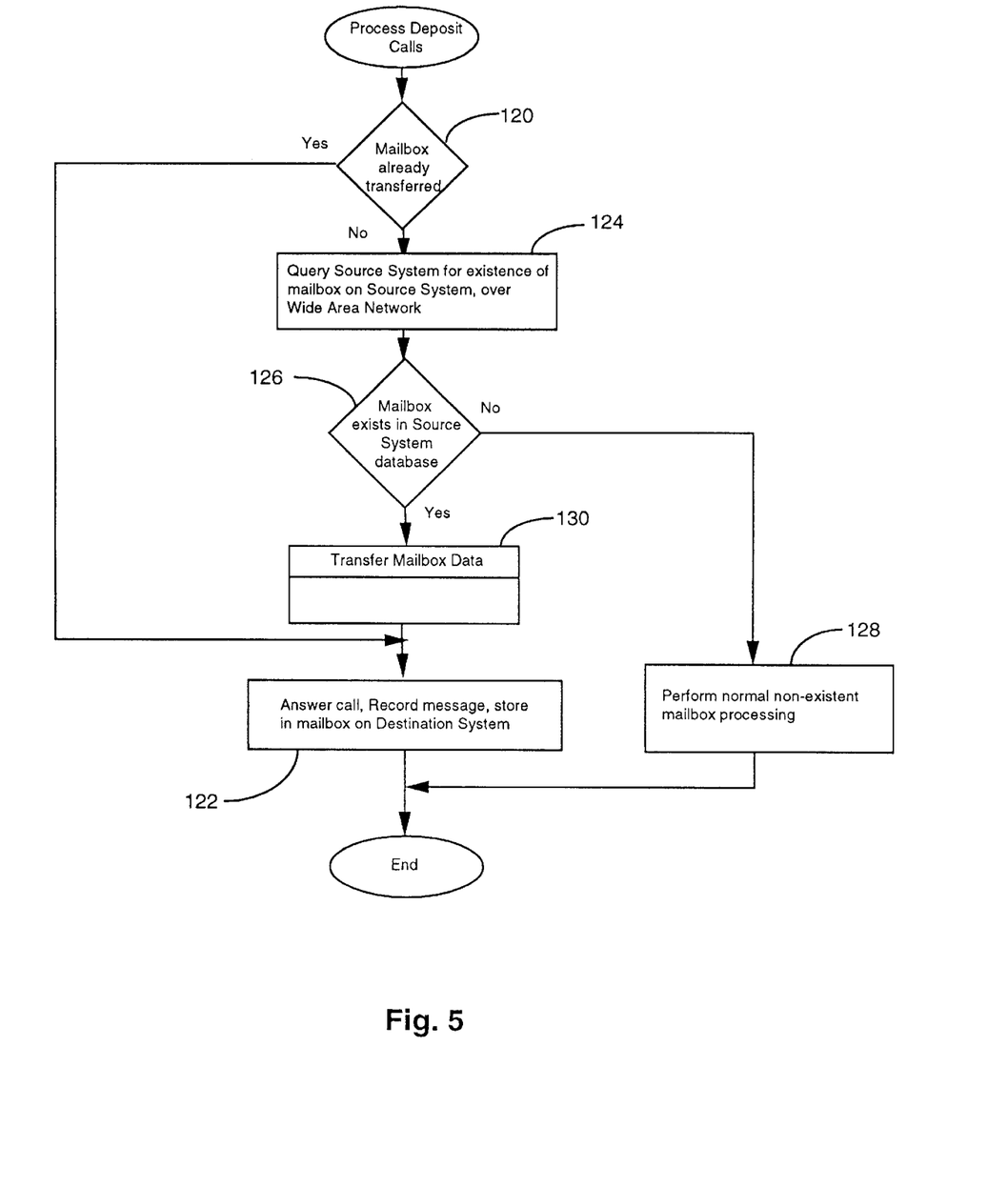
FIG. 5 is a flowchart of deposit call processing.

FIG. 5 is a flowchart illustrating the processing of deposit calls. Upon receiving a call from someone other than a subscriber accessing his or her voice mailbox, the destination system determines 120 whether there is a mailbox entry for the subscriber. If there is a mailbox entry, the call is processed 122 in the usual manner including answering the call, recording any message that is left and storing the address of the message if one is left. If no mailbox is found corresponding to the number called by the caller, the destination system queries 124 the source system for existence of the mailbox on the source system, using the WAN. Where more than one source system exists, as in the example illustrated in FIG. 3, the migration range(s) determine which system should be used as the source system.

The source system handles the query in substantially the same manner as if the call had been received by the source system. The only difference is that the query is received over the WAN and the response is transmitted back to the destination system over the WAN. Conventional networking hardware and software are used to provide communication over the WAN, including at least one dedicated line and a bridge or router in each information services system 10, connecting the LAN 26 (FIG. 1) to the WAN. In each information services system 10, the configuration of the networking software is reconfigured to provide the requisite addressing information to route data over the WAN and the bridges or routers connecting the information services systems 10 at the time that the WAN is established.

When the destination system receives the response from the database query, the destination system is able to determine 126 whether the mailbox exists in the source system database. If the mailbox does not exist, the destination system performs 128 normal non-existent mailbox processing. For example, the call may be rejected, or a mailbox may be automatically created for the subscriber, depending upon the system default that has been established by the system administrator. If the query response received from the source system indicates the existence of the mailbox on the source system, mailbox data are transferred 130 as described below with reference to FIG. 6.

Figure 6:
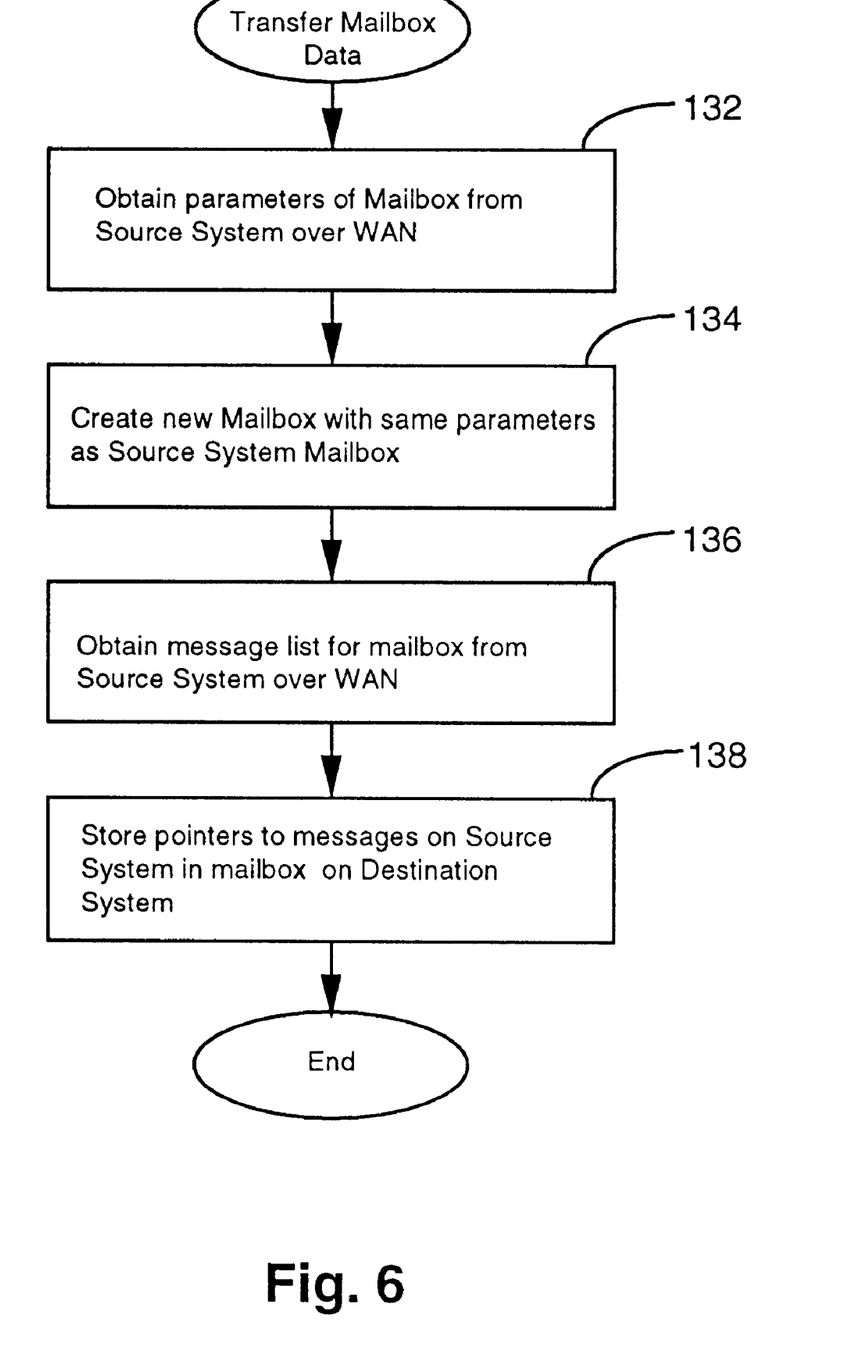
FIG. 6 is a flowchart of transferring mailbox data.

When the reply from the source system indicates that mailbox data are available on the source system, the destination system obtains 132 parameters of the mailbox from the source system by issuing another request and receiving the parameter information in reply. The destination system creates 134 a new mailbox using the parameters obtained from the source system. The destination system then obtains 136 the message list for the mailbox from the source system by issuing a request over the WAN and receiving the message list in reply. The message list contains pointers to the location of voice messages on the source system. These pointers are stored 138 in the mailbox created in step 134 on the destination system. In the preferred embodiment, the voice messages are not moved at this time to minimize the load on the source and destination systems, as well as the load on the WAN.

Figure 7:
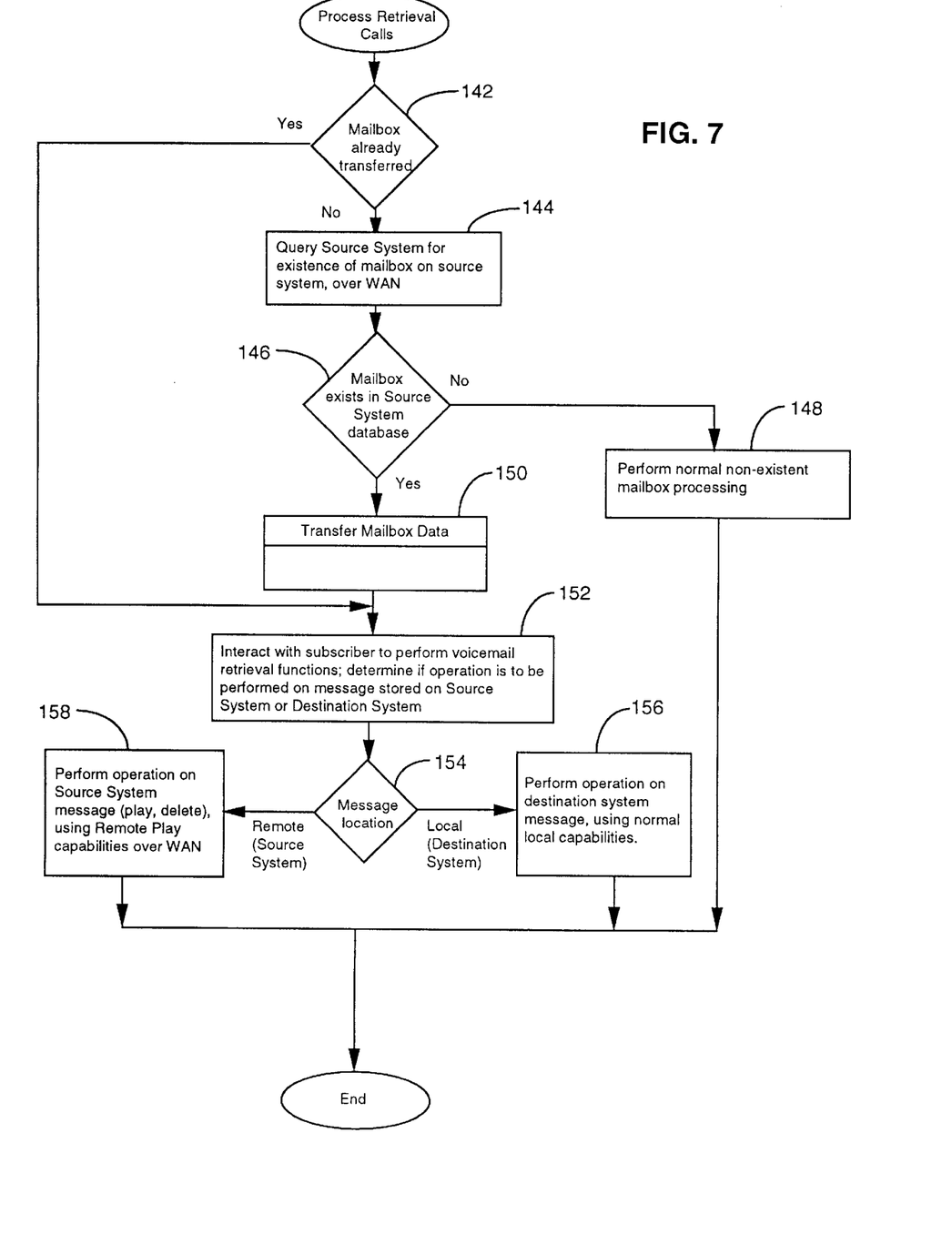
FIG. 7 is a flowchart of retrieval call processing.

As discussed above with reference to FIG. 4, when a subscriber calls to retrieve voice messages, the calls are processed by the destination system if the subscriber's mailbox is within the migration range(s). In this situation, the procedure illustrated in FIG. 7 is performed. First, it is determined 142 whether the mailbox has already been transferred, either by processing 106 a deposit or retrieval call or by the background migration utility 110. If all of the subscriber information is not on the destination system, the destination system queries 144 the source system for existence of the mailbox using the WAN. If it is determined 146 that the reply from the source system indicates that the mailbox does not exist, normal non-existent mailbox processing is performed 148. On the other hand, if the mailbox does exist, the mailbox data are transferred 150 in a manner similar to that discussed with reference to FIG. 6.

Once the mailbox has been transferred, whether during this call by the subscriber or previously, the destination system interacts 152 with the subscriber to perform voicemail retrieval functions. The addresses of the messages requested to be operated on by the subscriber determine whether the operation is to be performed on a message stored on the source system or the destination system. If it is determined 154 to process the message on the local or destination system, the destination system operates in a conventional manner to perform 156 the requested operation. If it is determined 154 that the message is located on the source system, the operations are performed 158 on both the local (destination) system and the remote (source) system Remote play may be used in performing 156 the operation on the local (destination) system alone and will always be used in performing 158 the operations on the destination and source systems.

As described in U.S. Pat. No. 5,029,199, conventionally remote play is used in a single information services system when a message for a subscriber is not stored by the APU 24 (FIG. 1) which is connected to the telephone used by the subscriber to retrieve the subscriber's messages. A message queue, stored on the MCU 12, 14 for each subscriber, identifies the physical location of each message. Assuming the subscriber retrieval process is executing on APU1 $24_1$ and the subscriber requests playback of a message stored on APU2 $24_2$, APU1 $24_1$ requests a data connection to APU2 $24_2$ via the LAN 26 using conventional networking software and translation tables maintained by the information services system software. Once the connection is established, a remote play process is executed by APU2 $24_2$ to retrieve voice data at the address in the message queue corresponding to the desired message. The remote play process transfers the voice data to APU1 $24_1$ using the connection established via the LAN 26. The subscriber retrieval process on APU1 $24_1$ receives the voice data transmitted via the LAN 26 and reproduces the message for the subscriber in a conventional manner.

After reconfiguring the networking software according to the present invention, the remote play capability enables a message stored on an APU in one information services system to be reproduced by an APU on another information services system. Assuming that the message stored on APU2 in information services system $10_A$ is to be reproduced by APU1 in information services system $10_B$, the process will be like that described above with the following differences. In addition to using the LAN 26 in information services system 10, the WAN link provided by dedicated line 86 (FIG. 3) and the LAN in information services system $10_B$ will be used, as well as a bridge or router (not shown) connected to the LAN 26 in each information services system $10_A$ and $10_B$ and connected to the WAN link 86. The networking software provides the requisite addressing information to route data over the WAN link 86 and the bridges or routers connecting the information services systems $10_A$ and $10_B$.

Figure 8:
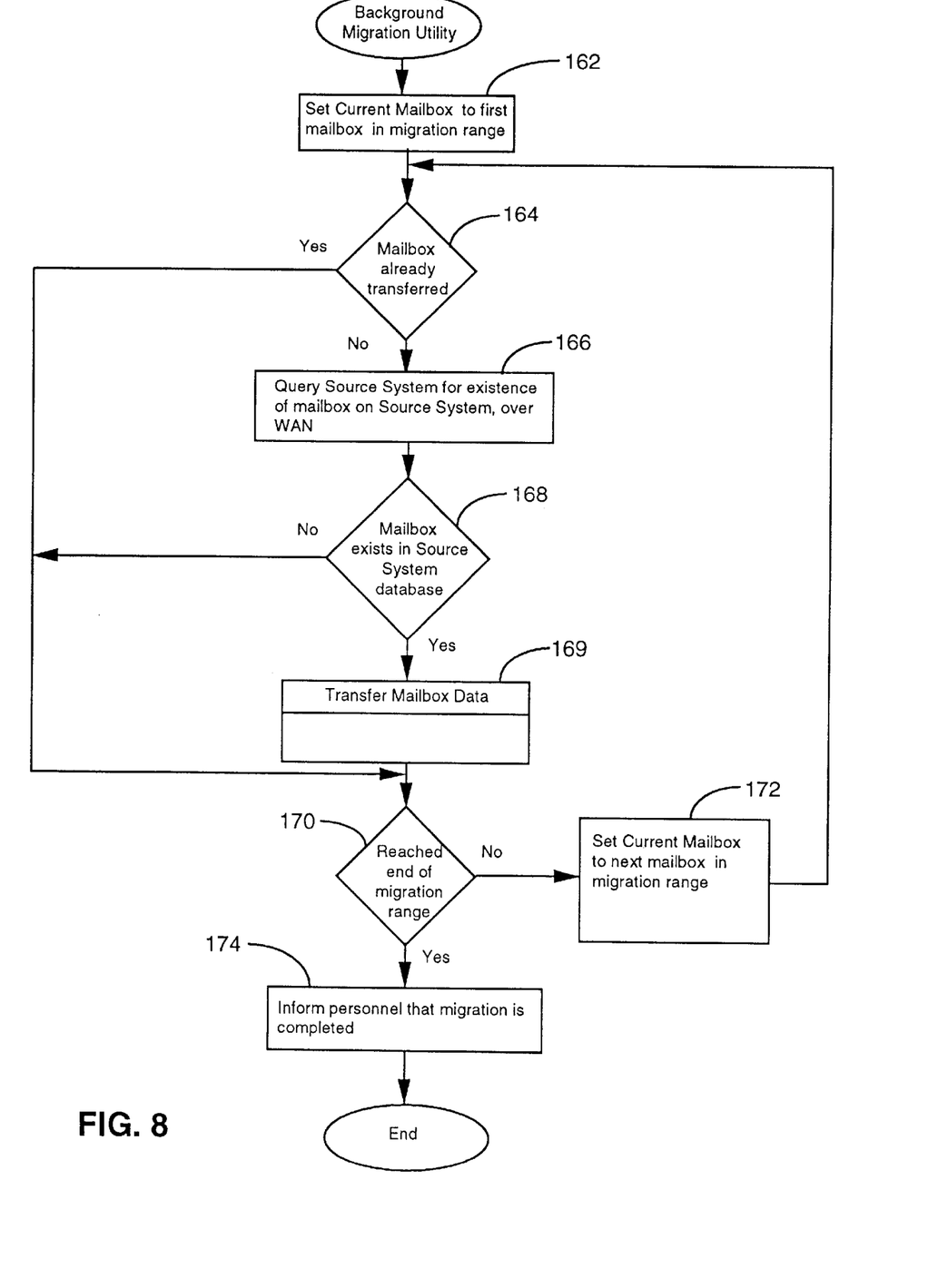
FIG. 8 is a flowchart of a background migration utility.

As discussed above with reference to FIG. 4, in any given period of time there are likely to be some number of mailboxes which are not transferred by processing 106 deposit calls and processing 108 retrieval calls. A flowchart of an example of a background migration utility to avoid this situation is illustrated in FIG. 8. The background migration utility is initiated by setting 162 a current mailbox to the first mailbox in a migration range. If more than one migration range has been specified, the procedure illustrated in blocks 162–172 in FIG. 8 is executed for each migration range. During execution of the procedure it is determined 164 whether the current mailbox has already been transferred by checking the database on the destination system When the background migration utility is first started, it is likely that none of the mailboxes have been transferred and so the destination system will query 166 the source system for existence of the mailbox on the source system over the WAN.

When the reply is received from the source system, the destination system determines 168 whether the mailbox exists on the source system database If so, the mailbox data are transferred 169 in a manner like that described in detail in FIG. 6. If the mailbox does not exist on the source system and after transfer is completed, the destination system determines 170 whether the end of the migration range has been reached. If not, the current mailbox is set 172 to the next mailbox in the migration range and processing continues at step 164.

If supported by the database server on the information services system, the query in step 166 can initially be a data transfer request for the first existing mailbox in the range and subsequently a request for the next existing mailbox. In this case, the reply received in response to either request will indicate if no more mailboxes are present in the range. Thus, step 168 can be eliminated and step 169 will include receiving the reply that all mailboxes have been transferred for a range. When the existing mailboxes in all of the migration range(s) have migrated, the destination system indicates 174 to operating personnel that the migration operation has been completed.

The present invention has been described in detail for the preferred embodiment which is directed to a voicemail system having a distributed architecture using a combination of local area networks (LANs) and a wide area network (WAN). However, the present invention may also be applied to expanding system resources in other distributed processing systems. Instead of processing deposit calls and retrieval calls, other sources of requests for access to the system may be used to initiate the transfer of data, while migration of pointers to data is executed in the background. For example, if the information services systems 10 are used to store any e-mail messages or faxes, either could be used to initiate migration. The invention can also be applied to systems which do not store any voicemail messages, but provide other services, such as e-mail, faxmail, fax-on-demand and interactive voice-response systems.

The many features and advantages of the present invention are apparent from the detailed specification and thus, it is intended by the appended claims to cover all such features and advantages of the system which fall within the true spirit and scope of the invention. Further, numerous modifications and changes will readily occur to those skilled in the art from the disclosure of this invention; thus, it is not desired to limit the invention to the exact construction and operation illustrated and described. Accordingly, simply modifications and equivalents may be resorted to, as falling within the scope and spirit of the invention.

What is claimed is:

1. A method of redistributing use of system resources from a first information services system to a second information services system, comprising the steps of:
   (a) establishing communication via a wide area network between the first and second information services systems;
   (b) specifying at least one migration range identifying migrating resources, defined by control data, to be migrated to the second information services system;
   (c) moving existing data associated with the migrating resources to the second information services system as the existing data need to be accessed by a requesting subscriber, using the wide area network; and
   (d) storing the control data, newly created data and modified data associated with the migrating resources on the second information services system.

2. A method as recited in claim 1, further comprising the step of (e) transferring the existing data in the at least one migration range from the first information services system to the second information services system via the wide area network as a background operation.

3. A method as recited in claim 1, wherein the first and second information services systems provide subscribers with a service requiring storage of the control data for each subscriber and message data associated with the subscribers, and
   wherein said moving in step (c) comprises the steps of:
   (c1) moving first control data corresponding to a first subscriber from the first information services system to the second information services system when a first process is initiated to deliver at least one message to the first subscriber; and
   (c2) moving second control data corresponding to a second subscriber from the first information services system to the second information services system when a second process is initiated to store at least one message for the second subscriber.

4. A method as recited in claim 1, wherein the first and second information services systems provide subscribers with a service requiring storage of the control data for each subscriber and message data associated with the subscribers,
   wherein said specifying in step (b) includes specifying migrating subscribers initially serviced by the first information services system, to be serviced by the second information services system,
   wherein said method further comprises the step of (e) activating migration of the control data, as part of the existing data associated with the migrating resources, for the migrating subscribers after said specifying in step (b) and before said moving and storing in steps (c) and (d), respectively, and wherein said moving in step (c) comprises the steps of:
   (c1) transmitting a request, from the second information services system to the first information services system, for the control data for an identified subscriber when the service provided for the identified subscriber is initially accessed after said activating in step (e); and
   (c2) receiving and storing at the second information services system the control data requested in step (c1).

5. A method as recited in claim 1, wherein the first and second information services systems provide subscribers with a service requiring storage of the control data for each subscriber and message data associated with the subscribers, and
   wherein said moving in step (c) comprises the step of (c1) retrieving the message data stored on the first information services system for the subscribers migrated to the second information services system only when the subscribers request retrieval of the message data.

6. A method as recited in claim 5, wherein said storing in step (d) comprises the steps of:
   (d1) storing new message data, directed to an identified subscriber, on the second information services system in a message deposit operation after the control data associated with the identified subscriber is moved in step (c); and
   (d2) updating the control data stored at the second information services system by adding a pointer to the new message data stored in step (d1).

7. A method of redistributing use of system resources from a first information services system to a second information services system, comprising:
   establishing a communication network connection between the first and second information services systems;
   specifying at least one migration range identifying migrating resources, defined by control data, to be migrated to the second information services system;
   moving existing data associated with the migrating resources to the second information services system as the existing data need to be accessed, using the communication network connection;
   storing the control data, newly created data and modified data associated with the migrating resources on the second information services system;
   transmitting data transfer requests, when the communication network connection is not used to capacity by said moving as the existing data need to be accessed, from the second information services system to the first information services system to request transfer of the control data included in the existing data associated with the migrating resources;
   transmitting from the first information services system to the second information services system, the control data associated with the migrating resources in response to the data transfer requests until all of the control data associated with the migrating resources are stored on the second information services system.

8. A method of redistributing use of system resources from a first information services system to a second information services system providing subscribers with at least one service, including voicemail processing, and requiring storage of control data for each subscriber and message data associated with the subscribers, the control data including parameters defining voice mailboxes each storing a message list containing pointers to the message data for one of the subscribers, said method comprising;

establishing a communication network connection between the first and second information services systems;

specifying at least one migration range identifying migrating resources, defined by the control data, for migrating subscribers, initially serviced by the first information services system, to be serviced by the second information services system;

moving existing data associated with the migrating resources to the second information services system as the existing data need to be accessed, using the communication network connection;

storing the control data, newly created data and modified data associated with the migrating resources on the second information services system; and     activating migration of the control data, as part of the existing data associated with the migrating resources, for the migrating subscribers after said specifying and before said moving and storing,     said moving including         transmitting a request, from the second information services system to the first information services system, for the control data for an identified subscriber when the service provided for the identified subscriber is initially accessed after said activating,         receiving and storing at the second information services system the control date for the identified subscriber, including creating a new voice mailbox for the identified subscriber at the second information services system,         transmitting a request from the second information services system to the first information services system for the message list for the identified subscriber, and         receiving and storing the message list in the new voice mailbox at the second information services system, initially all of the pointers in the message list stored at the second information services system pointing to the message data stored at the first information services system.

9. A method as recited in claim 8, wherein said moving further comprises retrieving the message data stored on the first information services system for the subscribers migrated to the second information services system only when the subscribers request playback of the message data.

10. A method as recited in claim 8, wherein said storing comprises:

storing new message data on the second information services system when a voicemail message is created for the identified subscriber after said moving; and     updating the message list stored in the new mailbox at the second information services system by adding a pointer for each of the voicemail messages created by said storing of the new message data.

11. A resources distributing system, comprising:

a first information services system;

a second information services system, said second information services system specifying at least one migration range identifying migrating resources, defined by control data, of subscribers to be migrated from the first information services system to the second information services system; and a communication network connecting said first and second information services systems, to move message data associated with the migrating resources from said first information services system to said second information services system when the subscribers request playback of the message data, said second information services system storing the control data and newly created data and modified data associated with the migrating resources.

12. A resources distributing system as recited in claim 11, wherein each of said first and second information services systems includes     at least one processor coupled to said communication network; and     at least one storage unit, coupled to said at least one processor, to store the control data and message data associated with the subscribers and at least one program executable by the at least one processor to control delivery of messages to the subscribers based on the message data, and     wherein said processor in each of said first and second information services systems communicates with said communication network under control of the at least one program to transfer the control data corresponding to one of the subscribers from said first information services system to said second information services system upon initiation of delivery of at least one of the messages to the one of the subscribers.

13. A resources distributing system as recited in claim 11, wherein each of said first and second information services systems includes     at least one processor coupled to said communication network; and     at least one storage unit, coupled to said at least one processor, to store the control data and message data associated with the subscribers and at least one program executable by the at least one processor to control delivery of messages to the subscribers based on the message data, and     wherein said processor in each of said first and second information services systems communicates with said communication network under control of the at least one program to activate migration of the control data for the subscribers within the at least one migration range and to transfer the control data corresponding to an identified subscriber from said first information services system to said second information services system when the service provided for the identified subscriber is initially accessed after migration has been activated.

14. A resources distributing system as recited in claim 11, wherein each of said first and second information services systems includes     at least one processor coupled to said communication network; and     at least one storage unit, coupled to said at least one processor, to store the control data and message data associated with the subscribers and at least one program executable by the at least one processor to deliver messages to the subscribers by retrieving the message data stored on said at least one storage unit in said first information services system for the subscribers migrated to said second information services system only when the subscribers request retrieval of the message data.

15. A resources distributing system as recited in claim 11, wherein said communication network is a wide area network coupled to said first and second information services systems.

16. A resources distributing system, comprising:

first information services system;

a second information services system, said second information services system specifying at least one migration range identifying migrating resources, defined by control data, to be migrated from the first information services system to the second information services system; and a communication network connecting said first and second information services systems, to move existing data associated with the migrating resources from said first information services system to said second information services system as the existing data need to be accessed by a requesting subscriber and to move a portion of the existing data in a background operation, said second information services system storing the control data, newly created data and modified data associated with the migrating resources.

17. An information services network, comprising:

first and second information services systems, said second information services system specifying migrating resources to be migrated from the first information services system to the second information services system, said first information services system including at least one control storage unit to store control data associated with at least a first group of subscribers of at least one service;

at least one control processor coupled to said at least one control storage unit;

at least one application processor coupled to said at least one control processor; and at least one application storage unit, coupled to said at least one application processor, to store message data associated with at least the first group of the subscribers, said second information services system including at least one control storage unit to store the control data associated with a second group of the subscribers of the at least one service;

at least one control processor coupled to said at least one control storage unit in said second information services system, said at least one control processor in said first and second information services systems programmed to transfer corresponding control data associated with a corresponding subscriber in the second group of subscribers and included in the migrating resources, from said first information services system to said second information services system when the corresponding subscriber requests performance of the at least one service requiring use of the corresponding control data by said at least one control processor in said second information services system;

at least one application processor coupled to said at least one control processor in said second information services system; and at least one application storage unit, coupled to said at least one application processor in said second information services system, to store message data associated with the second group of subscribers and at least one program executable by said at least one application processor in said second information services system to deliver messages to the subscribers associated with the migrating resources by retrieving requested message data corresponding to a requested message and stored on said at least one application storage unit in said first information services system when a request is received to deliver the requested message; and a communication network connecting said first and second information services systems, to move the control and message data included in the migrating resources from said first information services system to said second information services system in response to operations of said control and application processors in said first and second information services systems.

18. An information services network as recited in claim 17, wherein said communication network is a wide area network coupled to said first and second information services systems.

* * * * *

UNITED STATES PATENT AND TRADEMARK OFFICE
CERTIFICATE OF CORRECTION

PATENT NO.: 5,909,483
DATED : June 1, 1999
INVENTOR(S): Gerald W. Weare, et al.

It is certified that error appears in the above-identified patent and that said Letters Patent is hereby corrected as shown below:

Column 2, line 17, after "system" insert --.--.

Column 3, line 52, after "reference" insert --.--;
line 67, change "Ti" to --T1--.

Column 7, line 39, after "tem" insert --.--.

Column 8, line 6, change "10" to --$10_A$--;
line 27, after "system" insert --.--;
line 35, after "database" insert --.--

Signed and Sealed this

Sixth Day of February, 2001

Attest:

Q. TODD DICKINSON

*Attesting Officer*  *Director of Patents and Trademarks*